Jan. 8, 1963

M. S. KRYNAK 3,072,092

VEHICLE WARNING BELL

Filed Aug. 17, 1961

INVENTOR.
MICHAEL S. KRYNAK
BY Donald G. Dalton
ATTORNEY

Jan. 8, 1963   M. S. KRYNAK   3,072,092
VEHICLE WARNING BELL
Filed Aug. 17, 1961
2 Sheets-Sheet 2

INVENTOR.
MICHAEL S. KRYNAK
BY
Donald G. Dalton
ATTORNEY

United States Patent Office 3,072,092
Patented Jan. 8, 1963

3,072,092
VEHICLE WARNING BELL
Michael S. Krynak, Parkville, Minn., assignor to United
States Steel Corporation, a corporation of New Jersey
Filed Aug. 17, 1961, Ser. No. 132,105
4 Claims. (Cl. 116—60)

This invention relates to an improved warning bell assembly for use on a vehicle.

An object of the invention is to provide a warning bell assembly which has an improved actuating mechanism for sounding the bell as a vehicle travels in one direction, but not in the other.

A further object is to provide an improved bell assembly particularly for use on railroad dump cars, in which the bell automatically sounds as a locomotive pushes the car but remains silent as the locomotive pulls the car.

A more specific object is to provide an improved bell actuating mechanism which is driven from a vehicle wheel and includes a pivotally and slidably mounted clanger and a cam to pivot the clanger and sound the bell as the wheel turns in one direction, but to slide the clanger aside without sounding the bell as the wheel turns in the other direction.

In accomplishing these and other objects of the invention, I have provided improved details of structure, a preferred form of which is shown in the accompanying drawings, in which.

Figure 1:
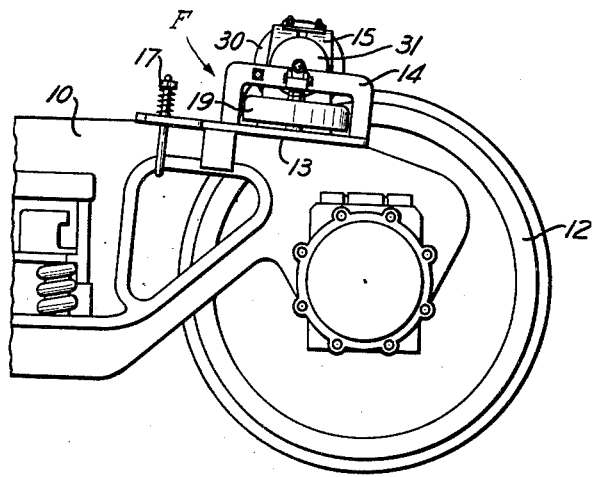
FIGURE 1 is a front elevational view of a portion of a railroad car truck which carries a bell assembly constructed in accordance with my invention.
Figure 2:
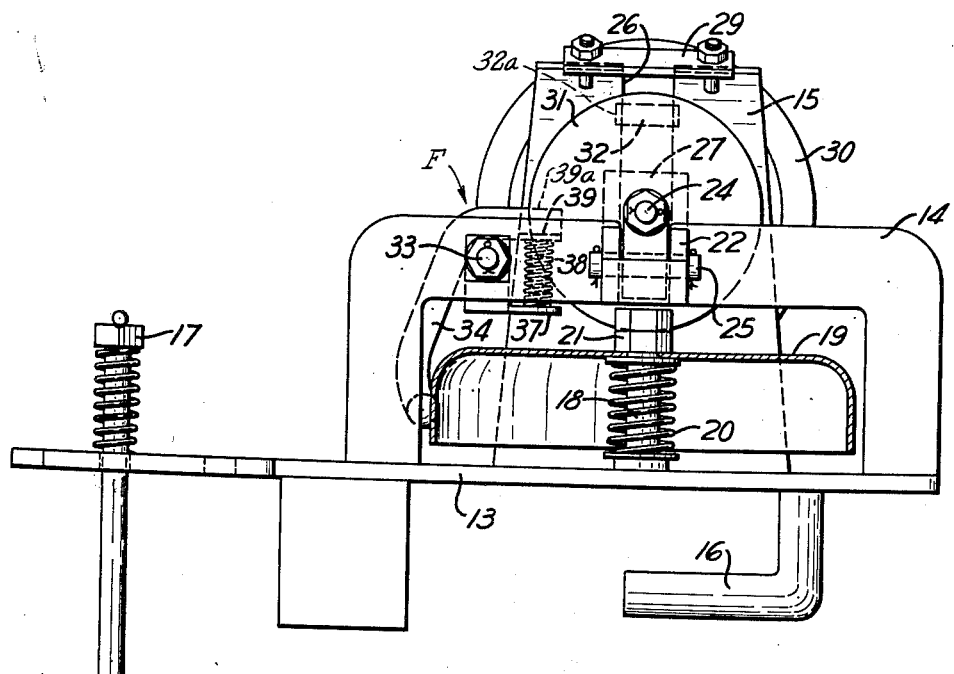
FIGURE 2 is a front elevational view on a larger scale of the bell assembly with the bell itself shown in section.

FIGURE 1 shows a portion of a conventional railroad car truck, which includes a truck frame 10 and a wheel 12. The frame F of my bell assembly is removably attached to the top of the truck frame and includes a base plate 13, an outer arch-shaped upright 14 and a curved inner upright 15, all rigidly interconnected. The attaching means shown includes a depending hook 16 fixed to the underside of plate 13 adjacent one end, and a pair of spring-loaded J-shaped clamping bolts 17 which extend through openings in plate 13 adjacent the other end. Hook 16 extends through an opening in the top of the truck frame, while bolts 17 engage opposite sides of the truck frame. Thus I can install or remove my bell assembly readily, as when the car travels on other than its usual route. The intermediate portion of plate 13 carries an upright stud 18 on which a vibrating bell 19 is mounted. A compression spring 20 encircles stud 18 and holds the bell against the underside of a nut 21, whereby the peripheral portions of the bell are free to vibrate.

The outside face of upright 14 carries a clevis 22. A tubular outer housing element 23 for a drive shaft 24 is pivoted to the clevis on a pin 25 to swing on a horizontal axis. Upright 15 has a vertical slot 26 in which a bracket 27 is slidably mounted. This bracket carries a tubular inner housing element 28 for the drive shaft. A retainer plate 29 is fixed to the top of upright 15 to prevent unintentional removal of bracket 27. The drive shaft 24 is journaled in the two housing elements 23 and 28 and carries at its inner end a drive wheel 30 of rubber or the like which bears against the car wheel 12, whereby rotation of the car wheel rotates the shaft. The weight of the drive shaft, its housing and the drive wheel holds the drive wheel in contact with the car wheel, while the pivotal mounting on pin 25 allows flexibility to compensate for wear or variations in wheel dimensions.

A cam plate 31 is fixed to the drive shaft 24 intermediate the two housing elements 23 and 28. The inner face of plate 31 carries a wedge-shaped cam 32. A horizontal clanger shaft 33 is fixed to the inside face of upright 14 and extends inwardly therefrom. A clanger 34 is pivotally and slidably mounted on shaft 33, whereby it can swing about the axis thereof and also move in the direction of the axis. A compression spring 35 encircles shaft 33 inwardly of clanger 34 and bears against the clanger at one end and against a fixed washer 36 at the other end and thus urges the clanger outwardly along the shaft. A depending spring support 37 is mounted on shaft 33 outwardly of the clanger and acts as a stop limiting outward sliding movement of the clanger. A compression spring 38 bears at its lower end against support 37 and at its upper end against a lever 39 which forms part of the clanger and is integral therewith.

Figure 3:
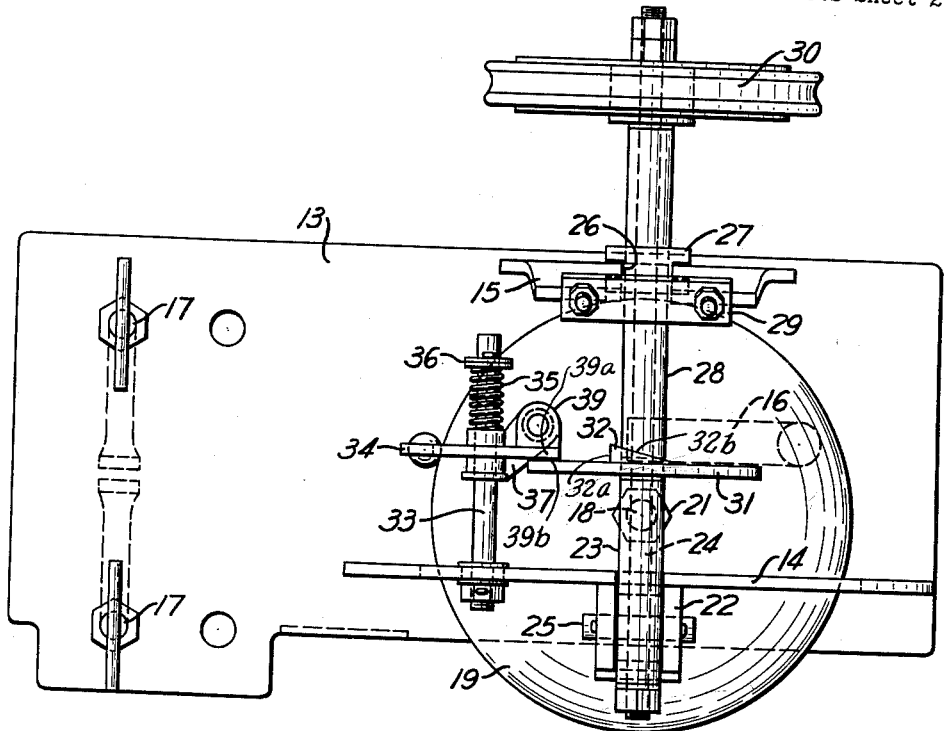
FIGURE 3 is a top plan view of the assembly shown in FIGURE 2.
Figure 4:
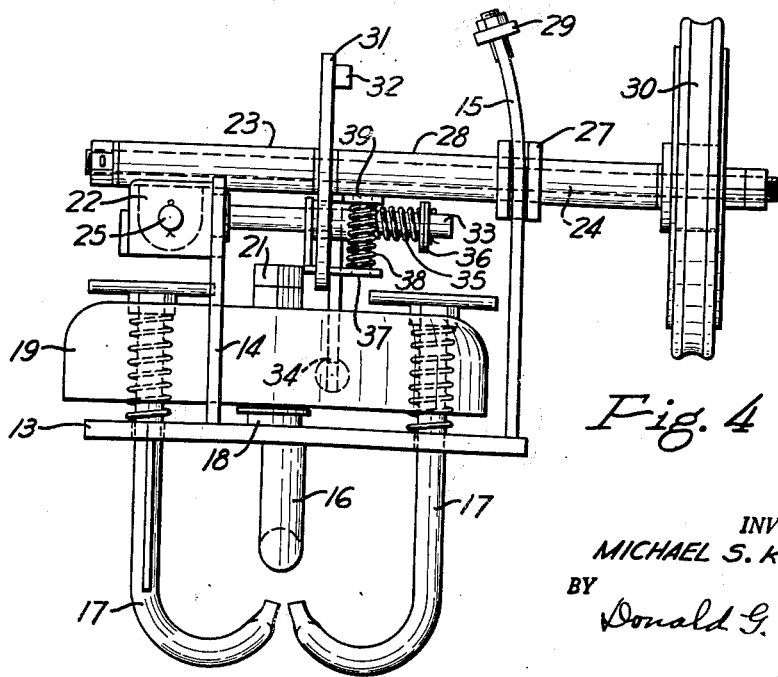
FIGURE 4 is an end elevational view of the device shown in FIGURE 3 taken from the right.

When shaft 24 and plate 31 rotate counterclockwise, the flat edge 32a of cam 32 strikes the upper surface 39a of lever 39 once each revolution (FIGURE 3). The lever and clanger 34 swing clockwise against the action of spring 38. When the cam releases the lever on continued rotation, the clanger returns and strikes bell 19. Spring 38 snaps the clanger against the bell with sufficient force to sound the bell clearly. When shaft 24 and plate 31 rotate clockwise, the cam surface 32b of cam 32 engages the vertical surface 38b of lever 39 and pushes the clanger axially along shaft 33 against the action of spring 35 without sounding the bell.

From the foregoing description it is seen that my invention affords a simple practical mechanism for actuating a warning bell on a vehicle as the vehicle travels in one direction, but not in the other. As already pointed out, I can readily install or remove my bell assembly. Normally I install the assembly at the leading end of a lead car which a locomotive is pushing. Thus the bell gives warning where needed. When the locomotive pulls the car in the opposite direction, no warning is sounded since none is needed.

While I have shown and described only a single embodiment of my invention, it is apparent that modifications may arise. Therefore, I do not wish to be limited to the disclosures set forth but only by the scope of the appended claims.

I claim:

1. A warning bell assembly comprising a frame, a drive shaft journaled with respect to said frame, a drive wheel carried by said drive shaft for rotating it, a bell mounted on said frame beneath said drive shaft, a clanger shaft fixed to said frame and spaced from said drive shaft, a clanger mounted on said clanger shaft to swing about the axis thereof and also to move in the direction of the axis and positioned to strike said bell, spring means urging said clanger to a position for striking said bell, and a cam carried by said drive shaft and engageable with said clanger to swing the clanger and strike the bell as said drive shaft rotates in one direction and to move the clanger axially without striking the bell as the drive shaft rotates in the other direction.

2. A warning bell assembly comprising a base plate, spaced outer and inner uprights fixed to said plate, a pair of tubular housing elements respectively pivoted to said outer upright on a horizontal axis and slidably supported on said inner upright, a drive shaft journaled in said housing elements, a drive wheel carried by said drive shaft for rotating it, a bell mounted on said plate beneath said drive shaft, a clanger shaft fixed to said outer upright and spaced from said drive shaft, a clanger mounted on said clanger shaft to swing about the axis thereof and also to move in the direction of the axis and being positioned to strike said bell, spring means urging said clanger to a position for striking said bell, a lever carried by said clanger, and a cam carried by said drive shaft intermediate said housing elements and engageable with said lever to swing the clanger and strike the bell as said drive shaft rotates in one direction and to move the clanger axially without striking the bell as the drive shaft rotates in the other direction.

3. The combination, with a vehicle which includes a frame and a wheel journaled to said frame, of a warning bell assembly comprising a second frame mounted on said first named frame, a drive shaft journaled with respect to said second frame, a drive wheel carried by said drive shaft and engaging the vehicle wheel for rotating the drive shaft, a bell mounted on said second frame beneath said drive shaft, a clanger shaft fixed to said second frame and spaced from said drive shaft, a clanger mounted on said clanger shaft to swing about the axis thereof and also to move in the direction of the axis and positioned to strike said bell, spring means urging said clanger to a position for striking said bell, and a cam carried by said drive shaft and engageable with said clanger to swing the clanger and strike the bell as said drive shaft rotates in one direction and to move the clanger axially without striking the bell as the drive shaft rotates in the other direction.

4. The combination, with a vehicle which includes a frame and a wheel journaled to said frame, of a warning bell assembly comprising a base plate detachably mounted on said frame, spaced outer and inner uprights fixed to said plate, a pair of tubular housing elements respectively pivoted to said outer upright on a horizontal axis and slidlably supported on said inner upright, a drive shaft journaled in said housing elements, a drive wheel carried by said drive shaft and engaging the vehicle wheel for rotating the drive shaft, a bell mounted on said plate beneath said drive shaft, a clanger shaft fixed to said outer upright and spaced from said drive shaft, a clanger mounted on said clanger shaft to swing about the axis thereof and also to move in the direction of the axis and being positioned to strike said bell, spring means urging said clanger to a position for striking said bell, a lever carried by said clanger, and a cam carried by said drive shaft intermediate said housing elements and engageable with said lever to swing the clanger and strike the bell as said drive shaft rotates in one direction and to move the clanger axially without striking the bell as the drive shaft rotates in the other direction.

References Cited in the file of this patent

UNITED STATES PATENTS

| | | |
|---|---|---|
| 1,102,340 | Kane | July 7, 1914 |
| 2,900,948 | Krynak | Aug. 25, 1959 |